Nov. 17, 1953  S. O. WALDING  2,659,591
WEIGHT INDICATING CART
Filed Jan. 26, 1952
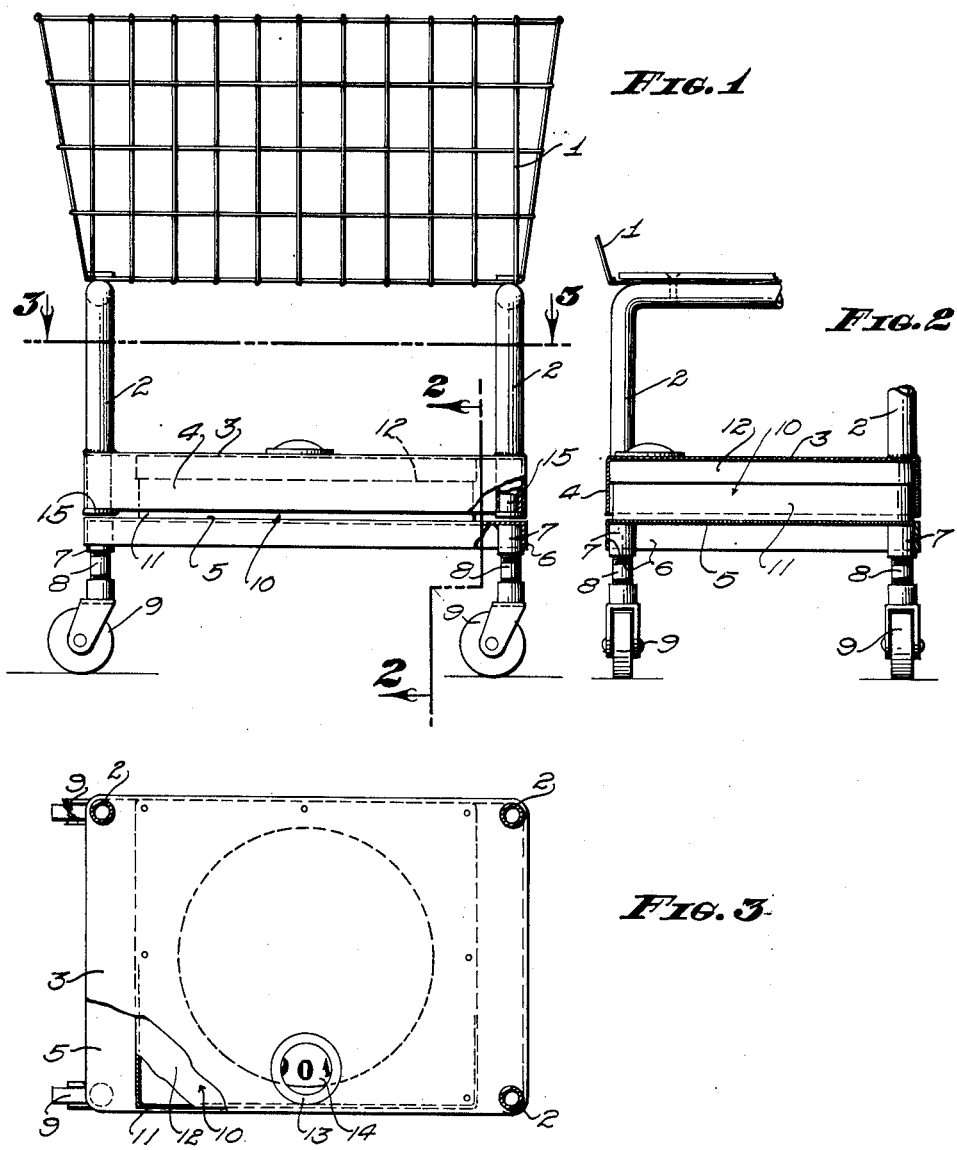
INVENTOR.
SAMUEL ODIS WALDING
BY
Lyon & Lyon
ATTORNEYS Patented Nov. 17, 1953

2,659,591

UNITED STATES PATENT OFFICE 2,659,591

WEIGHT INDICATING CART

Samuel Odis Walding, Santa Monica, Calif.

Application January 26, 1952, Serial No. 268,409

1 Claim. (Cl. 265—40)

My invention relates to weight indicating carts, and included in the objects of my invention are:

First, to provide a push cart having a basket or other container supported on castered legs and incorporating a scale permanently interposed in the legs of the cart so that the contents may be automatically weighed.

Second, to provide a device of this class wherein the legs which support the basket or other container are divided to permit interposing of a weight-indicating scale unit, and are provided with bumper elements between the separated portions of each leg so that concentrated loads of any one of the legs may be transmitted from the upper to the lower portions thereof without overloading the interposed scale unit.

Third, to provide a weight-indicating cart which, though particularly designed for weighing clothes to determine the proper load for cleaning machines such as used by cleaners and dyers, may be adapted for use wherever it is desired to weigh moderate amounts of material or products and thus is suitable for use in storage or warehouses or in manufacturing establishments.

With the above and other objects in view as may appear hereinafter, reference is directed to the accompanying drawings in which:

Figure 1 is a side view of my weight-indicating cart.

Figure 2 is a sectional view thereof through 2—2 of Fig. 1.

Figure 3 is a sectional view thereof through 3—3 of Figure 1.

My weight-indicating cart comprises a basket or container 1 of generally rectangular form. Secured to each end is an inverted U-shaped tubular member forming a pair of depending legs 2. The four legs thus provided extend through a plate 3 having a marginal skirt 4, and are securely welded to the plate and skirt. Below the plate 3 is a second plate 5, also having a marginal skirt 6. Welded in the corners of the plate 5 are four sockets 7 which receive screw threaded stems 8 which, in turn, screw thread into sockets, each forming a part of a caster 9.

Interposed between the pltaes 3 and 5 within the skirt 4 is a weighing scale unit 10. The scale unit per se may be conventional. One type of such scale comprises a pan 11 and a cover 12 capable of limited telescoping movement over the upper margins of the pan. Within the housing formed by the pan and cover is a conventional weighing lever system (not shown). The cover 12 is secured to the plate 3 whereas the pan 11 is secured to the plate 5. The cover 12 and the plate 3 are apertured to provide a viewing window 13 which may have a magnifying lens. Visible through the window 13 is a weight-indicating disk 14 operated by the weighing lever system.

The lower ends of the legs 2 confronting the corners of the plate 5 are provided with rubber bumpers 15 spaced sufficiently from the plate 5 to permit the necessary depression of the cover 12 required to permit operation of the weighing levers. However, should excessive loads be applied to any one or pair of legs which would tilt the cover 12 unduly, the bumpers 15 would engage the plate 5.

Having fully described my invention, it is to be understood that I do not wish to be limited to the details herein set forth, but my invention is of the full scope of the appended claim.

I claim:

A weight-indicating cart, comprising: an upper and a lower rectangular plate, each having a marginal skirt; a weight indicating unit interposed between said plates; downwardly directed rigid legs secured in the corners of said lower plate; a set of upwardly directed legs; secured to the corners of said upper plate; and a container carried by said upwardly directed legs; said plates movable to and from each other; and yieldable bumpers interposed between said plates to limit relative movement thereof.

SAMUEL ODIS WALDING.

References Cited in the file of this patent

UNITED STATES PATENTS

| Number | Name | Date |
|---|---|---|
| 1,965,302 | Wagner | July 3, 1934 |
| 2,194,976 | Hekrdle | Mar. 26, 1940 |
| 2,450,281 | Hudson | Sept. 28, 1948 |
| 2,560,945 | Goldberger | July 17, 1951 |
| 2,598,800 | Kopper | June 3, 1952 |

FOREIGN PATENTS

| Number | Country | Date |
|---|---|---|
| 321,596 | Great Britain | Nov. 14, 1929 |